United States Patent
Sun et al.

(10) Patent No.: US 6,826,902 B2
(45) Date of Patent: Dec. 7, 2004

(54) METHOD AND APPARATUS FOR ESTIMATING OXYGEN STORAGE CAPACITY AND STORED NOX IN A LEAN NOX TRAP (LNT)

(75) Inventors: Jing Sun, Bloomfield, MI (US); Yong-Wha Kim, Ann Arbor, MI (US); Le Yi Wang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/390,224

(22) Filed: Mar. 18, 2003

(65) Prior Publication Data
US 2004/0182068 A1 Sep. 23, 2004

(51) Int. Cl.⁷ .............................................. F01N 3/00
(52) U.S. Cl. ........................ 60/274; 60/276; 60/285; 60/297
(58) Field of Search .................... 60/274, 276, 285, 60/286, 297

(56) References Cited

U.S. PATENT DOCUMENTS

| | | | |
|---|---|---|---|
| 5,289,678 A | | 3/1994 | Grutter |
| 5,713,199 A | * | 2/1998 | Takeshima et al. .......... 60/276 |
| 5,847,271 A | | 12/1998 | Poublon et al. |
| 5,970,707 A | * | 10/1999 | Sawada et al. ............... 60/277 |
| 6,216,449 B1 | | 4/2001 | Stehlau |
| 6,289,673 B1 | | 9/2001 | Tayama et al. |
| 6,308,515 B1 | | 10/2001 | Bidner et al. |
| 6,357,224 B1 | | 3/2002 | Kawamoto et al. |
| 6,383,267 B1 | * | 5/2002 | Takaku et al. ................ 96/111 |
| 6,418,711 B1 | | 7/2002 | Surnilla et al. |
| 6,499,294 B1 | * | 12/2002 | Katoh et al. ................... 60/301 |

* cited by examiner

*Primary Examiner*—Binh Q. Tran
(74) *Attorney, Agent, or Firm*—Ford Global Technologies, LLC

(57) ABSTRACT

A method for predicting oxygen capacity of an LNT during storage phase of such LNT and the amount of NOx stored in the LNT during purge phase thereof as a function of the time history of an output signal produced by an exhaust gas sensor disposed downstream of the LNT. Oxygen storage capacity of the (LNT) is estimated by integrating output signal over time to determine the amount of oxygen stored in the LNT as function of time.

8 Claims, 6 Drawing Sheets

METHOD AND APPARATUS FOR ESTIMATING OXYGEN STORAGE CAPACITY AND STORED NOX IN A LEAN NOX TRAP (LNT)

TECHNICAL FIELD

This invention relates generally to lean burn internal combustion engine exhaust gas aftertreatment systems and methods and more particularly to systems and method for estimating oxygen storage capacity and stored NOx in a lean NOx trap aftertreatment systems.

BACKGROUND

As is known in the art, the exhaust gas generated by a typical internal combustion engine, as may be found in motor vehicles, includes a variety of constituent gases, including hydrocarbons (HC), carbon monoxide (CO), nitrogen oxides (NOx), carbon dioxide, nitrogen ($N_2$), and oxygen ($O_2$). The respective rates at which an engine generates these constituent gases are typically dependent upon a variety of factors, including such operating parameters as air-fuel ratio ($\lambda$), engine speed and load, engine temperature, ambient humidity, ignition timing ("spark"), and percentage exhaust gas recirculation ("EGR"). The prior art often maps values for instantaneous engine-generated or "feedgas" constituents, such as HC, CO and NOx, based, for example, on detected values for instantaneous engine speed and engine load (the latter often being inferred, for example, from intake manifold pressure).

In order to limit the amount of certain ones of the feedgas constituents that are exhausted through the vehicle's tailpipe to the atmosphere as "emissions", motor vehicles typically include an exhaust purification system having an upstream and downstream three-way catalyst. For engines capable of running lean of stoichiometry, a downstream three-way catalyst optimized to store and release NOx is used, referred to as a lean NOx trap. This catalyst stores NOx when the exhaust gases are "lean" of stoichiometry and releases previously-stored NOx for reduction to unregulated gases when the exhaust gases are "rich" of stoichiometry. In this manner, the trap permits intermittent lean engine operation, with a view toward maximizing overall fuel economy, while concomitantly serving to control vehicle tailpipe emissions.

More specifically, in one embodiment, the trap chemically stores NOx during lean-burn operation using alkaline metals, such as barium and/or strontium, in the form of a washcoat, although other elements can also be used. The NOx (NO and $NO_2$) are stored in the trap in the form of barium nitrate, for example. The washcoat also includes precious metals, such as platinum and palladium, which operate to convert NO to $NO_2$ for storage in the trap as a nitrate. The trap's washcoat typically also includes ceria, whose affinity for oxygen storage is such that, during initial lean engine operation, a quantity of the excess oxygen flowing through the trap is immediately stored in the trap. The amount of stored oxygen is essentially fixed, although it begins to lessen over time due to such factors as thermal degradation and trap aging.

The trap's actual capacity to store NOx is finite and, hence, in order to maintain low tailpipe NOx emissions when running "lean," the trap must be periodically cleansed or "purged" of stored NOx. During the purge event, excess feedgas HC and CO, which are initially consumed in the three-way catalyst to release stored oxygen, ultimately "break through" the three-way catalyst and enter the trap, whereupon the trap's barium nitrate decomposes into $NO_2$ for subsequent conversion by the trap's precious metals into harmless $N_2$ and $O_2$. The oxygen previously stored in the trap is also released during an initial portion of the purge event after the HC and CO break through the three-way catalyst.

Each purge event is characterized by a fuel "penalty" consisting generally of an amount of fuel required to release and convert both the oxygen stored in the three-way catalyst, and the oxygen and NOx stored in the trap. Moreover, the trap's NOx-storage capacity is known to decline in a generally reversible manner over time due to sulfur poisoning or "sulfurization," and in a generally irreversible manner over time due, for example, to component "aging" from thermal effects and "deep-diffusion"/"permanent" sulfurization. As the trap's capacity drops, the trap is "filled" more quickly, and trap purge events are scheduled with ever-increasing frequency. This, in turn, increases the overall fuel penalty associated with lean engine operation, thereby further reducing the overall fuel economy benefit of "running lean."

In order to restore trap capacity, a trap desulfurization event is ultimately scheduled, during which additional fuel is used to heat the trap to a relatively elevated temperature, whereupon a slightly rich air-fuel mixture is provided for a relatively extended period of time to release much of the stored sulfur and rejuvenate the trap. As with each purge event, each desulfurization event typically includes the further "fuel penalty" associated with the initial release of oxygen previously stored in the three-way catalyst and the trap. The prior art teaches scheduling a desulfurization event only when the trap's $NO_x$-storage capacity falls below a critical level, thereby minimizing the frequency at which such further fuel economy "penalties" are incurred.

Typically, an "optimal" operating policy which gives the best trade-off between fuel economy and emissions determines when the purge should be initiated or terminated based on operating conditions. The key variable in executing such an optimal solution is an estimate of the amounts of NOx and oxygen stored in LNT (the internal state of the LNT). The purge is initiated when the mass of stored NOx reaches a threshold, and terminated when the stored NOx is completely depleted. Any deviation from the optimal policy, resulting from estimation errors or control implementation errors may lead to adverse consequences on fuel economy and emissions.

Without on-line emission measurements to determine stored NOx or oxygen, one has to estimate the state of the LNT using models and other measured variables. Most commonly available sensors are the switching HEGO sensor located downstream of the trap, mass air flow rate sensor, etc. Since the switching HEGO sensor is positioned after the LNT, a significant time delay may occur between the HEGO switch signal and effective change of the engine feedgas air-to-fuel ratio. This will lead to HC and CO breaking through the exhaust system and cause emission concerns. To mitigate the effects of the time delay, a model-based strategy can be used to predict the end of purge cycle.

Thus, in the absence of on-line emission measurements, the control of lean burn engine aftertreatment system can be implemented by using models of feedgas emissions and the aftertreatment subsystems, together with measured variables such as mass air flow rate, feedgas and tailpipe relative air-to-fuel ratios, etc. When the ambient conditions (such as humidity, LNT brick temperature, and sulfur effects) change or the engine components age, oxygen storage capacity and NOx amount in the LNT vary significantly, and the performance of the control system that relies on these variables may deteriorate if the accuracy of the estimate deteriorate with the change in hardware.

The inventors have discovered that voltage time variations (trajectories) of a tailpipe HEGO sensor can provide sufficient information to predict oxygen capacity during storage phase and stored NOx during purge phase of a lean NOx trap (LNT). This result can be used to provide accurate prediction of the termination time of purge operation, leading to improved control strategies for LNT operation. Further, more expensive UEGO sensors can be avoided without tangible performance penalty on LNT control.

More particularly, the inventors have developed an estimation algorithm to determine the termination time of purge operation. This will reduce potential HC and CO emission problems, leading to improved control strategies for LNT operation. This finding also indicates that more expensive UEGO sensors can be avoided without tangible performance penalty on LNT control. Also, the need to determine the oxygen storage capacity of the LNT is fulfilled by processing the HEGO sensor signal.

SUMMARY

In accordance with the present invention, a method is provided for predicting oxygen capacity of an LNT during storage phase of such LNT and the amount of NOx stored in the LNT during purge phase thereof as a function of the time history of an output signal produced by an exhaust gas sensor disposed in an exhaust of an internal combustion engine. A method is provided for estimating oxygen storage capacity of a lean NOx trap (LNT) used in an internal combustion engine. A sensor is disposed in an exhaust downstream of the LNT. The sensor produces an output signal time history indicating an air-fuel ratio time history of such exhaust. The method includes integrating the output signal over time to determine the amount of oxygen stored in the LNT as a function of time. The method includes evaluating the integrated output signal at a time the voltage indicates the exhaust has switched from a condition rich of stoichiometry to a condition lean of stoichiometry. A relative amount of oxygen stored in the LNT is calculated at the switch time. The calculation is a function of the air-fuel ratio of the exhaust and the sensor output signal. The oxygen storage capacity is calculated as a function of the calculated relative amount of oxygen stored in the LNT at the switch time and the evaluated integrated output signal at the time the voltage indicates the exhaust has switched from rich of stoichiometry to lean of stoichiometry.

In accordance with another feature of the invention, a method is provided for estimating the amount of NOx in lean NOx trap (LNT) used in an internal combustion engine. The engine includes a sensor downstream of the LNT. The sensor produces an output signal time history indicating an air-fuel ratio time history of such exhaust. The method includes calculating an oxygen rate from the LNT as over time and an estimated oxygen storage capacity of the LNT. The calculated oxygen rate is evaluated at a time the voltage indicates the exhaust has switched from a condition lean of stoichiometry to a condition rich of stoichiometry. A NOx release rate is calculated at the switch time, such release rate being a function of the output voltage at the switch time. The amount of NOx in the LNT is calculated as a function of time using as an initial condition the calculate NOx release rate at the switch time.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
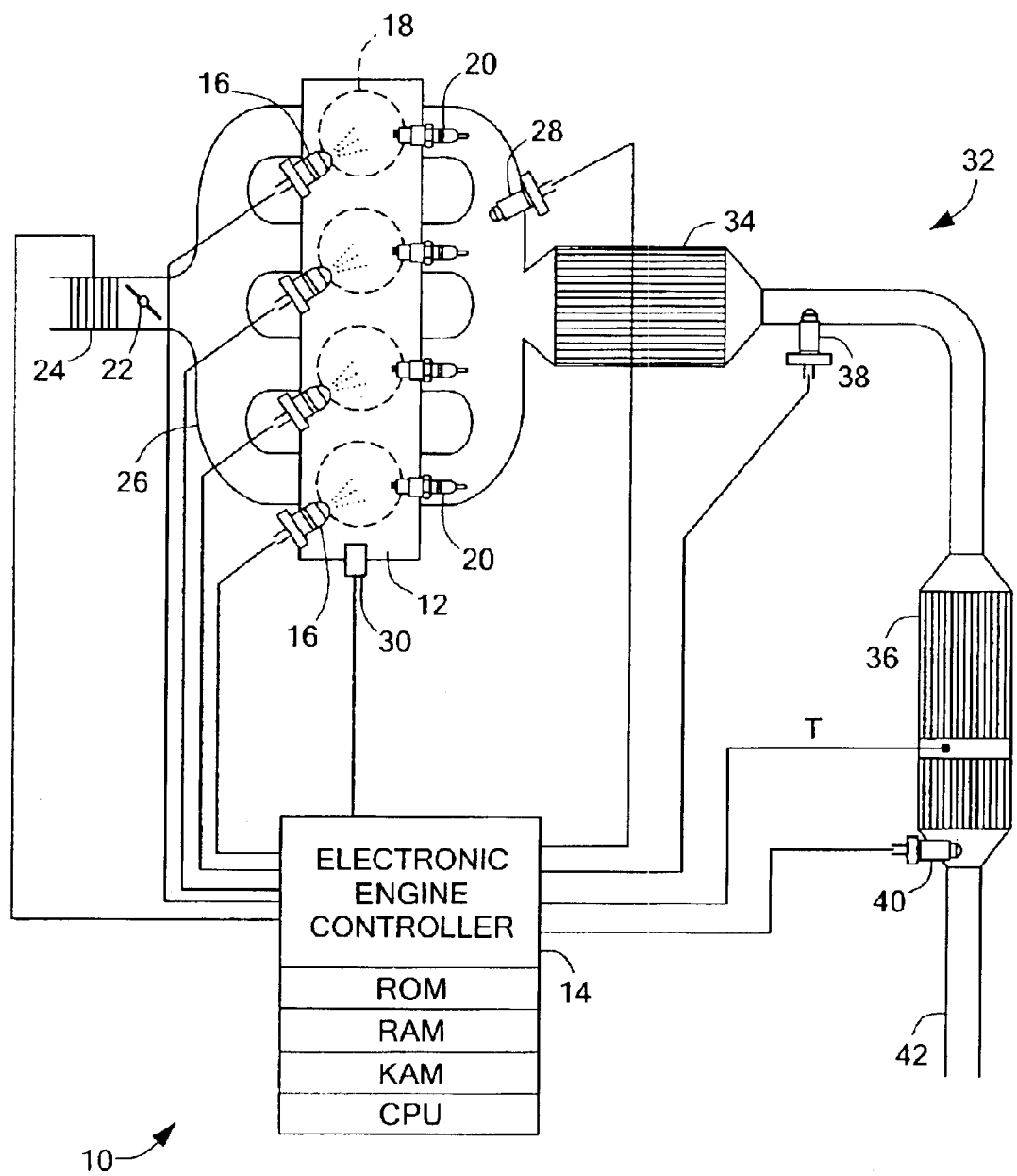
FIG. 1 is a schematic diagram of an engine for practicing the invention.

Referring to FIG. 1, an exemplary control system 10 for a gasoline-powered internal combustion engine 12 of a motor vehicle includes an electronic engine controller 14 having a processor ("CPU"), input/output ports, an electronic storage medium containing processor-executable instructions and calibration values, shown as read-only memory ("ROM") in this particular example, random-access memory ("RAM"), "keep-alive" memory ("KAM"), and a data bus of any suitable configuration. The controller 14 receives signals from a variety of sensors coupled to the engine 12 and/or the vehicle as described more fully below and, in turn, controls the operation of each of a set of fuel injectors 16, each of which is positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake to the engine's intake manifold 26, provides a signal MAF representing the air mass flow resulting from positioning of the engine's throttle 22. The air flow signal MAF from the air mass flow sensor 24 is utilized by the controller 14 to calculate an air mass value AM which is indicative of a mass of air flowing per unit time into the engine's induction system.

A first sensor 28 coupled to the engine's exhaust manifold detects the oxygen content of the exhaust gas generated by the engine 12 and transmits a representative output signal to the controller 14. The first sensor 28 provides feedback to the controller 14 for improved control of the air-fuel ratio of the air-fuel mixture supplied to the engine 12, particularly during operation of the engine 12 at or near the stoichiometric air-fuel ratio ($\lambda$.=1.00). A plurality of other sensors, indicated generally at 30, generate additional signals including an engine speed signal N and an engine load signal LOAD in a known manner, for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes a plurality of emissions control devices, specifically, an upstream three-way catalytic converter 34 and a downstream NOx trap, here LNT 36. The three-way catalyst 34 contains a catalyst material that chemically alters the exhaust gas in a known manner. The LNT 36 alternately stores and releases amounts of engine-generated NOx, based upon such factors, for example, as the intake air-fuel ratio, the trap temperature T (as determined by a suitable trap temperature sensor, not shown), the percentage exhaust gas recirculation, the barometric pressure, the relative humidity of ambient air, the instantaneous trap "fullness," the current extent of "reversible" sulfurization, and trap aging effects (due, for example, to permanent thermal aging, or to the "deep" diffusion of sulfur into the core of the trap material which cannot subsequently be purged). A second sensor, here HEGO sensor 38, is positioned immediately downstream of the LNT 36, provides exhaust gas oxygen content information to the controller 14 in the form of an output signal. The HEGO sensor's output signal, and more particularly, the time rate of change, or trajectory of such HEGO sensor 38 output signal is useful in characterizing the trap's NOx-storage ability and oxygen storage capacity of the LNT 36 in a manner to be described further below.

Generally, during vehicle operation, the controller 14 selects a suitable engine operating condition or operating mode characterized by combustion of a "near-stoichiometric" air-fuel mixture, i.e., one whose air-fuel ratio is either maintained substantially at, or alternates generally about, the stoichiometric air-fuel ratio; or of an air-fuel mixture that is either "lean" or "rich" of the near-stoichiometric air-fuel mixture. A selection by the controller 14 of "lean burn" or stratified engine operation, signified by the setting of a suitable lean-burn request flag to logical one, means that the controller 14 has determined that conditions are suitable for enabling the system's lean-burn feature, whereupon the engine 12 is alternatingly operated with lean and rich air-fuel mixtures for the purpose of improving overall vehicle fuel economy. The controller 14 bases the selection of a suitable engine operating condition on a variety of factors, which may include determined measures representative of instantaneous or average engine speed/engine load, or of the current state or condition of the trap (e.g., the trap's NOx-storage efficiency, the current NOx "fill" level, the current NOx fill level relative to the trap's current NOx-storage capacity, the trap's temperature T, and/or the trap's current level of sulfurization), or of other operating parameters, including but not limited to a desired torque indicator obtained from an accelerator pedal position sensor, the current vehicle tailpipe NOx emissions, the percent exhaust gas recirculation, the barometric pressure, or the relative humidity of ambient air.

The following notation is used herein:

$x_{oxy}$ is stored oxygen (g)

$\theta$ is the relative amount of stored oxygen (unitless)

$C_{oxy}$ is the available oxygen storage capacity (g)

MAF is the mass air flow rate (g/s)

$\alpha_L$ is the LNT oxygen storage coefficient $\lambda_{in}$ is the inlet gas relative air-to-fuel ratio (i.e., the air-fuel ratio of engine exhaust entering the LNT)

$\lambda_{tp}$ is tailpipe relative air-to-fuel ratio i.e., the air-fuel ratio of engine exhaust leaving the LNT)

v is the HEGO sensor voltage (volt)

$W_{NOx}^{in}$ is the NOx flow rate into the LNT (g/s)

$W_{NOx}^{tp}$ is the NOx flow rate out of the LNT (g/s)

$W_{CO}^{in}$ is the CO flow rate into the LNT (g/s)

$W_{CO}^{tp}$ is the CO flow rate out of the LNT (g/s)

$\dot{x}_a$ is the adsorption rate of NOx onto the storage suites (g/s)

$\dot{x}_d$ is the desorption rate of NOx from the storage sites (g/s)

$C_{NOx}$ is the total available NOx storage capacity (g)

$X_{NOx}$ the amount of stored NOx (g)

To predict the termination of purge operation, it is necessary to know the internal state of the LNT, namely the amount of stored oxygen and NOx. Since the internal state is not directly measured, it must be estimated from available models and measured variables.

Under a normal operating condition, a lean burn port fuel injection (PFI or direct injection stratified charge (DISC) engine runs lean of stoichiometry. The excessive NOx and oxygen in the exhaust gas will be stored in the LNT. At the initial phase of a rich-to-lean switch in the inlet air-fuel ratio, a large portion of excessive oxygen in the feedgas (after the TWC) will be stored in the LNT. As a result, the tailpipe effective air-to-fuel ratio will remain near the stoichiometric value. It follows that the voltage (emf) of the tailpipe HEGO sensor will remain high. The oxygen storage efficiency of the LNT decreases as the amount of stored oxygen increases. Hence, a gradually increasing portion of the feedgas oxygen will break through to the tailpipe, resulting in an increase of the tailpipe air-to-fuel ratio. HEGO voltage switches when this ratio reaches the switching point of the sensor. It should be cautioned that this switching does not indicate the end of oxygen storage. In fact, for typical combinations of the LNT and HEGO, the oxygen amount is only 60% of its storage capacity at the switching time. Nevertheless, this switching can be used to derive the actual oxygen storage capacity. This derivation depends on the LNT model and HEGO characteristics.

More particularly, the oxygen storage model used here is adopted from the work described in E. Brandt, Y. Wang, and J. Grizzle, Dynamic modeling of a three-way catalyst for SI engine exhaust emission control, IEEE Trans. Control Systems Technology, Vol. 8, No. 5, pp. 767–776, 2000. The model equation is briefly mentioned below. The dynamics of oxygen storage is described, in either lean (storage) or rich (release) operations as:

$$\frac{d\theta}{dt} = \frac{0.21}{C_{oxy}} \cdot \alpha_L \cdot \rho_L(\theta) \cdot MAF \cdot \left(1 - \frac{1}{\lambda_{in}}\right), \lambda_{in} \geq 1 \quad (1)$$

$$= \frac{0.21}{C_{oxy}} \cdot \alpha_R \cdot \rho_R(\theta) \cdot MAF \cdot \left(1 - \frac{1}{\lambda_{in}}\right), \lambda_{in} < 1$$

where $$\theta = \frac{x_{oxy}}{C_{oxy}}$$

is the relative amount of stored oxygen with respect to the available oxygen storage capacity. Here, $\alpha_L(=1.1)$ and $\alpha_R(=1)$ are constants and $\rho_L(\theta)$ and $\rho_R(\theta)$ are nonlinear functions indicating the relative storage and release rate respectively as shown in FIG. 2.

Figure 2:
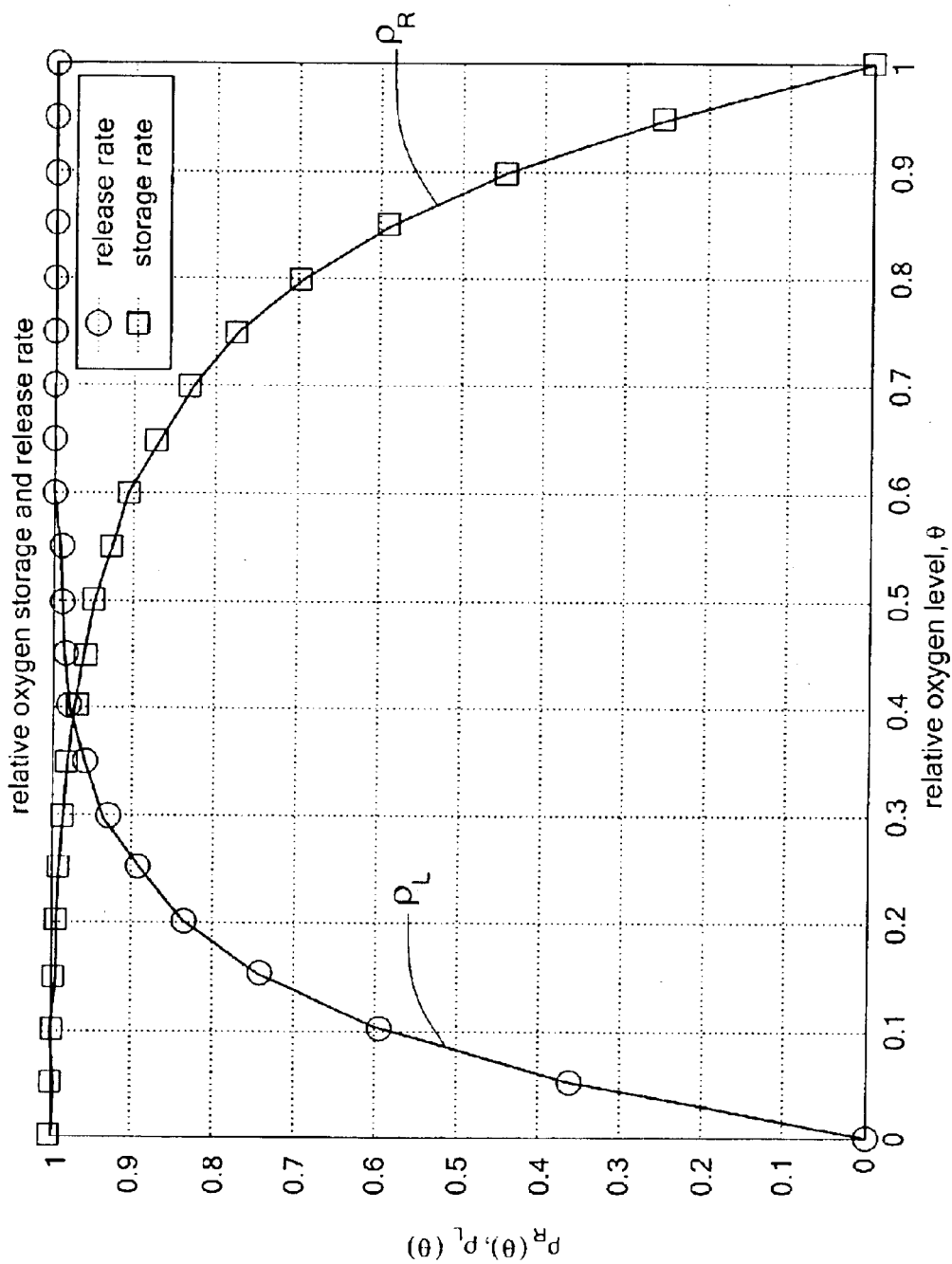
FIG. 2 are curves showing the relationship between an LNT oxygen storage rate and release rate as a function of the relative oxygen level in such LNT, such LNT being used in the system of FIG. 1.

It is noted from FIG. 2 that the oxygen storage capacity varies with LNT aging. For LNT control strategy development, it is of essential importance that the oxygen storage capacity can be estimated on-line. It is observed that if at time t, one can estimate simultaneously $\theta(t)$ and $x_{oxy}(t)$, then $C_{oxy}$ can be calculated from $$C_{oxy} = \frac{x_{oxy}(t)}{\theta(t)}.$$

It is observed that the tailpipe relative air-fuel ratio is related to the inlet air-fuel ratio and the stored oxygen through the following equation:

$$\lambda_{tp} = \lambda_{in} - \alpha_L \cdot \rho_L(\theta) \cdot (\lambda_{in} - 1) \quad (2)$$

Here, we make use of the property that the rate of NOx purge decreases as the stored NOx amount is reduced. This indicates that the stored NOx amount can be deduced from the rate of NOx release. As will be described in more detail below, the rate of NOx release can be estimated by the HEGO sensor voltage changes (i.e., HEGO trajectory). Consequently, an estimation of the stored NOx can be achieved.

More particularly, during rich operation, both stored oxygen and stored NOx will be purged. Although there are many possible model structures to represent dynamic behavior of the LNT purge operation, a relatively simple structure is used as shown in equations (3) and (4). The stored NOx changes when the adsorption and desorption rates of NOx become different, $$\frac{dx_{NOx}}{dt} = \dot{x}_a - \dot{x}_d. \quad (3)$$

While the underlying chemical process of adsorption and desorption occurs persistently, the accumulated effects can be simply characterized as: Storage when $\dot{x}_a > \dot{x}_d$ and Purge when $\dot{x}_a < \dot{x}_d$. These relationships are based on the assumptions that (1) the rate of desorption decreases as the stored NOx is reduced; (2) the rate of adsorption depends on the rate of NOx reaction with CO; and (3) the available CO is reduced by its reaction with released oxygen. Here, we assume that the reaction with CO is dominant. As a result, NOx reaction with other reductant such as HC and $H_2$ is not included. With these assumptions, the following relations can be established during purge operation:

$$\dot{x}_d = c_1 x_{NOx}, \quad (4a)$$

$$\dot{x}_a = c_2[W_{NOx}^{in} + \dot{x}_d - \beta(W_{CO}^{in} - c_3 \alpha \dot{x}_{oxy})] \quad (4b)$$

Under rich operation, $W_{NOx}^{in}$ is nearly zero due to the high NOx reduction efficiency of the TWC in this range. Note that since the released oxygen from oxygen storage reacts with CO to produce $CO_2$, part of CO in the in-coming gas will be consumed and hence not available for NOx purge, leading to the term $W_{CO}^{in} - c_3 \alpha \dot{x}_{oxy}$ where $\alpha$ is the fraction of the released $O_2$ that reacts with CO and $c_3$(= 1.7506) is the constant for corresponding CO consumption. $\beta$ reflects the portion of CO that reacts with $NO_x$. Here, $\beta$=0.6569 is used. From the oxygen storage model and the initial value of the oxygen stored (assuming the oxygen storage capacity is fully utilized at the beginning of the purge, the initial condition for $x_{oxy}$ can be set to equal to $C_{oxy}$), $x_{oxy}(t)$ can be derived.

Combining the equation 4a and 4b, we have $$\frac{dx_{NOx}}{dt} = c_2[W_{NOx}^{in} + c_1 x_{NOx} - 0.6569(W_{CO}^{in} - 1.7506\alpha \dot{x}_{oxy})] - c_1 x_{NOx} \quad (5)$$

The values for $c_1$ and $c_2$ are determined from experimental data. The key property that will be useful for the subsequent development is that the function is locally and partially invertible with respect to $x_{NOx}$. In other words, if other variables are constants, then given $\dot{x}_{oxy}$ and $\dot{x}_{NOx}$, we can calculate $x_{NOx}$ from this relationship.

The tailpipe $O_2$ and CO flow rates can be expressed as, (note that both $\dot{x}_{oxy}$ and $\dot{x}_{NOx}$ are negative during purge)

$$W_{O_2}^{tp} = -(1-\alpha)\dot{x}_{oxy} \quad (6a)$$

$$W_{CO}^{tp} = W_{CO}^{in} + c_3 \alpha \dot{x}_{oxy} + \beta \dot{x}_{NOx} \quad (6b)$$

The methodology introduced relies critically on characterizations of HEGO sensors. Two approaches are employed herein in deriving functional dependence of the output voltage of an HEGO sensor on the gas mixture. The first one expresses the voltage as a function of the air-to-fuel ratio. This characterization is relatively simple and has been used extensively in air-to-fuel ratio control problems. When the dominant influence on the tailpipe mixture is caused by oxygen storage effects during the storage phase, this characterization is sufficient. However, for the purge operation when released NOx and unused CO play a significant role in the exhaust mixture, a more fundamental characterization of the HEGO sensor becomes necessary. Here, the inverse Redox number is used to characterize the HEGO voltage function. These two characterizations are detailed in the followings.

HEGO Voltage versus Air-Fuel Ratio

Figure 3:
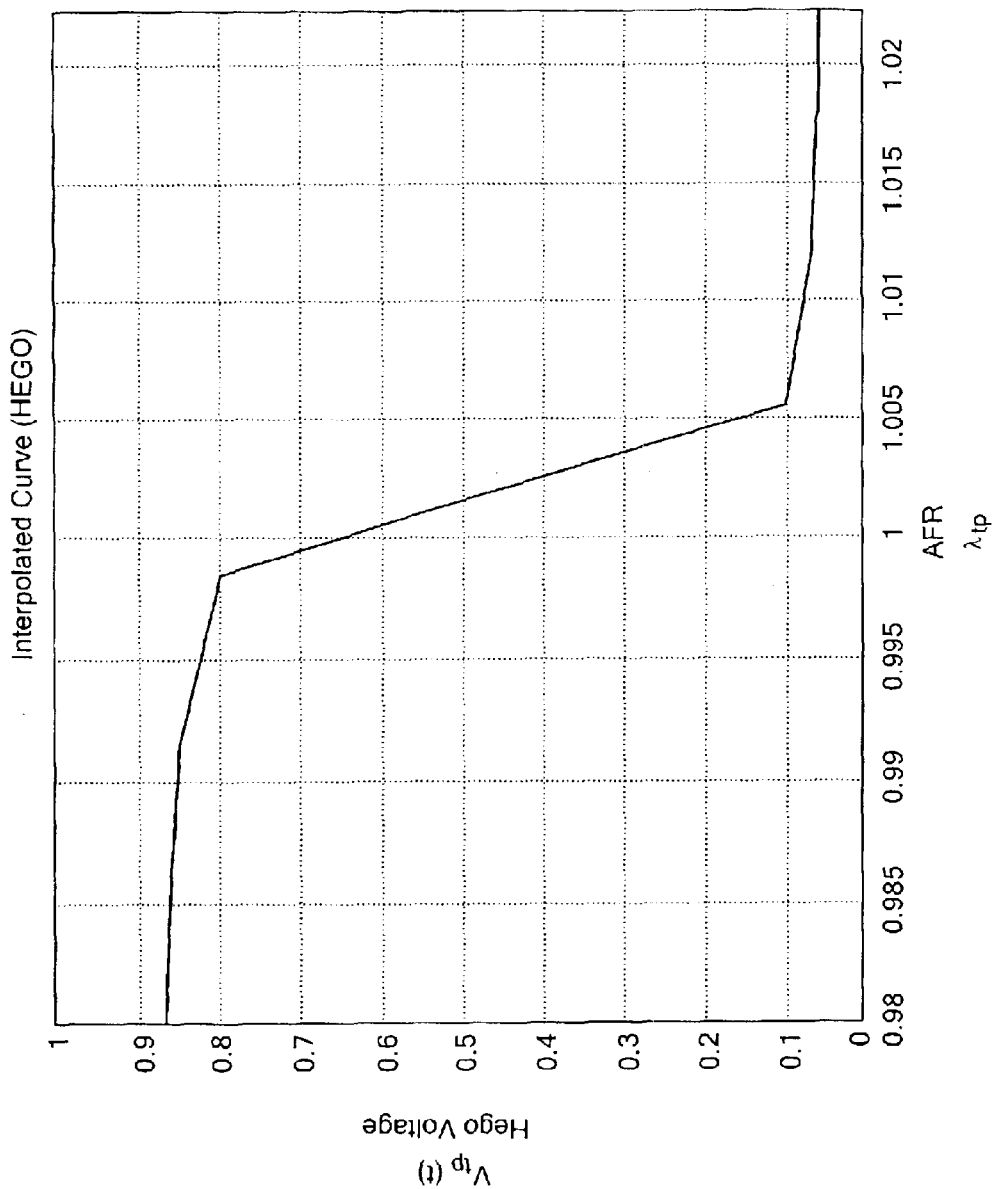
FIG. 3 shows the relationship between a voltage produced at the output of a HEGO sensor used in the system of FIG. 1 as a function of air-fuel ratio sensed by such HEGO sensor.

For a given temperature, HEGO voltage v is a function of the relative air-to-fuel ratio, as show in FIG. 3. A typical form of the function are characterized by high voltage flat section when $\lambda \leq \lambda_f$; a continuous one-to-one function when $\lambda_f < \lambda \leq \lambda_s - \epsilon$; and a sharp drop to a low voltage $v_s$ at $\lambda \geq \lambda_s + \epsilon$:

$$v = v_f \text{ when } \lambda \leq \lambda_f$$

$$v = g(\lambda) \text{ when } \lambda_f < \lambda \leq \lambda_{s-\epsilon}$$

$$v = v_s \text{ when } \lambda \geq \lambda_s + \epsilon \quad (7)$$

where $\epsilon$ is a small value describing the narrow range of voltage drops. Within this $\lambda$ window, the voltage drops rapidly and $\lambda \approx \lambda_s$ can be used. As an example, an interpolated HEGO voltage curve for a typical HEGO sensor is depicted in FIG. 3. This HEGO sensor has $\lambda_f$=0.988, $\lambda_s$=1.0025; and $\epsilon$=0.025.

HEGO Voltage versus Inverse Redox Ratio

Figure 4:
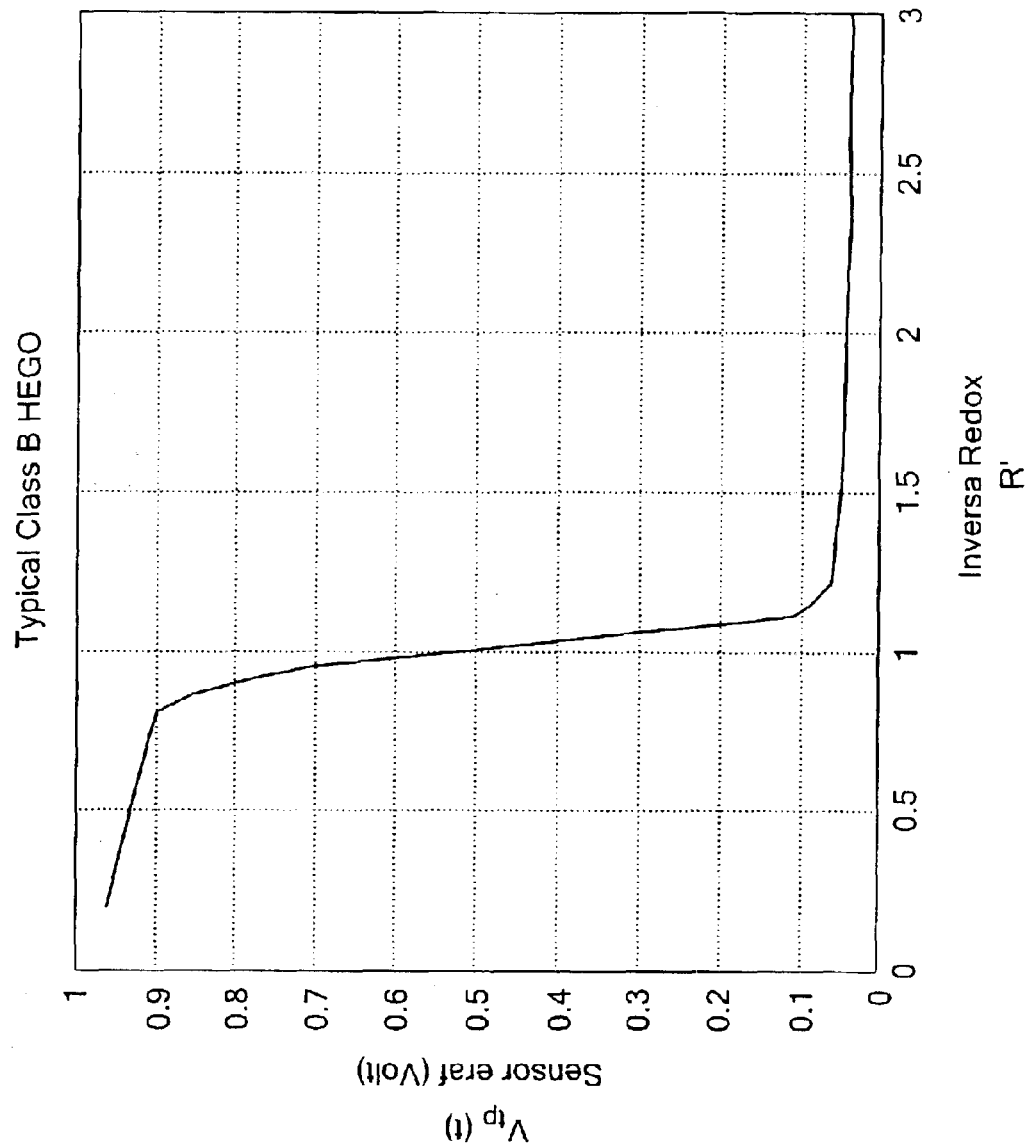
FIG. 4 shows the relationship between a voltage produced at the output of a HEGO sensor used in the system of FIG. 1 as a function of Redox number.

From chemical reactions and physics principles, HEGO voltage (emf) can be defined as a switch-type nonlinear function of R' (known as inverse Redox ratio) and temperature T, as shown by the curve in FIG. 4.

$$v = g(R', T) \quad (8)$$

For a fixed temperature $T_o$, the switching point $R_o'$ is known. The typical value of $R_o'$ is 1 at stoichiometry.

The inverse Redox ratio of the tailpipe gas mixture is related to the partial pressures of constituents as:

$$R' = \frac{2p_{O_2} + p_{NOx}}{p_{CO} + p_{H_2} + 3\cdot 8\cdot p_{HC}} \quad (9)$$

Using the relationship between partial pressures $P_{O2}$, $P_{NO}$, $P_{CO}$, $P_{H2}$, $P_{HC}$, and mole fractions $\tilde{x}_{O_2}$, $\tilde{x}_{NO}$, $\tilde{x}_{H_2}$, $\tilde{x}_{HC}$, as described in J. B. Heywood, Internal Combustion Engine Fundamentals, New York: McGraw-Hill, 1988

$$\frac{p_{O_2}}{p} = \tilde{x}_{O_2} = \frac{\frac{W^{tp}_{O_2}}{M_{O_2}}}{\frac{W^{tp}_{total}}{M^{tp}_{total}}}, \text{ etc.} \quad (10)$$

where $M_{O2}$ is the molecular weight of $O_2$. The denominator factor is the ratio of total flow rate over the total molecular weight of the tailpipe exhaust mixture. This factor will be cancelled out in calculating the inverse Redox values. It follows that (noting that $\dot{x}_{NOx} \leq 0$ in rich operation)

$$R' = \frac{2\frac{-(1-\alpha)\dot{x}_{oxy}}{M_{O_2}} - \frac{\dot{x}_{NOx}}{M_{NOx}}}{\frac{W^{in}_{CO} + c_3\alpha\dot{x}_{oxy} + \beta\dot{x}_{NOx}}{M_{CO}} + \frac{W^{in}_{H_2}}{M_{H_2}} + 3\cdot 8\cdot \frac{W^{in}_{HC}}{M_{HC}}} \quad (11)$$

By combing equation (8) and (11), it becomes clear that the HEGO voltage is a nonlinear function of the LNT internal state. Due to its switching nature, this nonlinear function is not invertible. However, its smooth segment implies that a small range of the nonlinear function is invertible. This fact will be elaborated below.

Estimation of the Oxygen Storage Capacity Coxy in Lean Operation

When the air-to-fuel ratio of the in-coming gas changes from rich to lean, excessive $NO_x$ and $O_2$ in the feedgas will be stored in the LNT. Usually, oxygen storage capacity is filled much faster than NOx storage. As a result, the dynamic impact of the stored NOx on the tailpipe air-to-fuel ratio will be ignored in the following analysis. In the following derivations, we assume that feedgas MAF and air-to-fuel ratio are known.

In lean operation, the stored oxygen evolves according to the dynamics described in equation (1). Initially at the starting time of storage, $\lambda_{tp}$ quickly falls into the range $\lambda_f < \lambda \leq \lambda_s - \epsilon$. As a result, the function $v_{tp} = g(\lambda_{tp})$ is invertible and $\lambda_{tp}$ can be roughly estimated from the HEGO voltage by $\lambda_{tp} = g^{-1}(v_{tp})$. It follows that when $\lambda_f < \lambda_{tp} < \lambda_s - \epsilon$ $$x_{oxy} = 0.21\alpha_L\rho_L(\theta)\cdot MAF\left(1 - \frac{1}{\lambda_{in}}\right) \text{ from equation (1)} \quad (12)$$

$$= \frac{\lambda_{in} - g^{-1}(v_{tp}(t))}{\lambda_{in}} 0.21 MAF \text{ from equation (2)}$$

Starting from the zero initial condition, $x_{oxy}(t)$, $t \geq 0$ can be calculated by integration $$x_{oxy}(t) = \int_0^t \left[\frac{\lambda_{ib} - g^{-1}(v_{tp}(t))}{\lambda_{in}(t)} 0.21 MAF\right] dt \quad (13)$$

This integration is of beneficial in filtering out random measurement noises on the HEGO voltage, improving the quality of $x_{oxy}(t)$ as time increases.

Suppose that at $t=t_1$, the HEGO voltage switches from high to low. At that time, $x_{oxy}(t_1)$ is known from the equation (13) and $\lambda_{tp}=\lambda_s$. From $$\lambda_{tp}=\lambda_s=\lambda_{in}-\alpha_L\rho_L(\theta)(\lambda_{in}-1) \quad (14)$$

$\theta(t_1)$ can be derived. It follows that the oxygen storage capacity can be derived at the time of HEGO switching:

$$C_{oxy} = \frac{x_{oxy}(t_1)}{\theta(t_1)} \quad (15)$$

Figure 5:
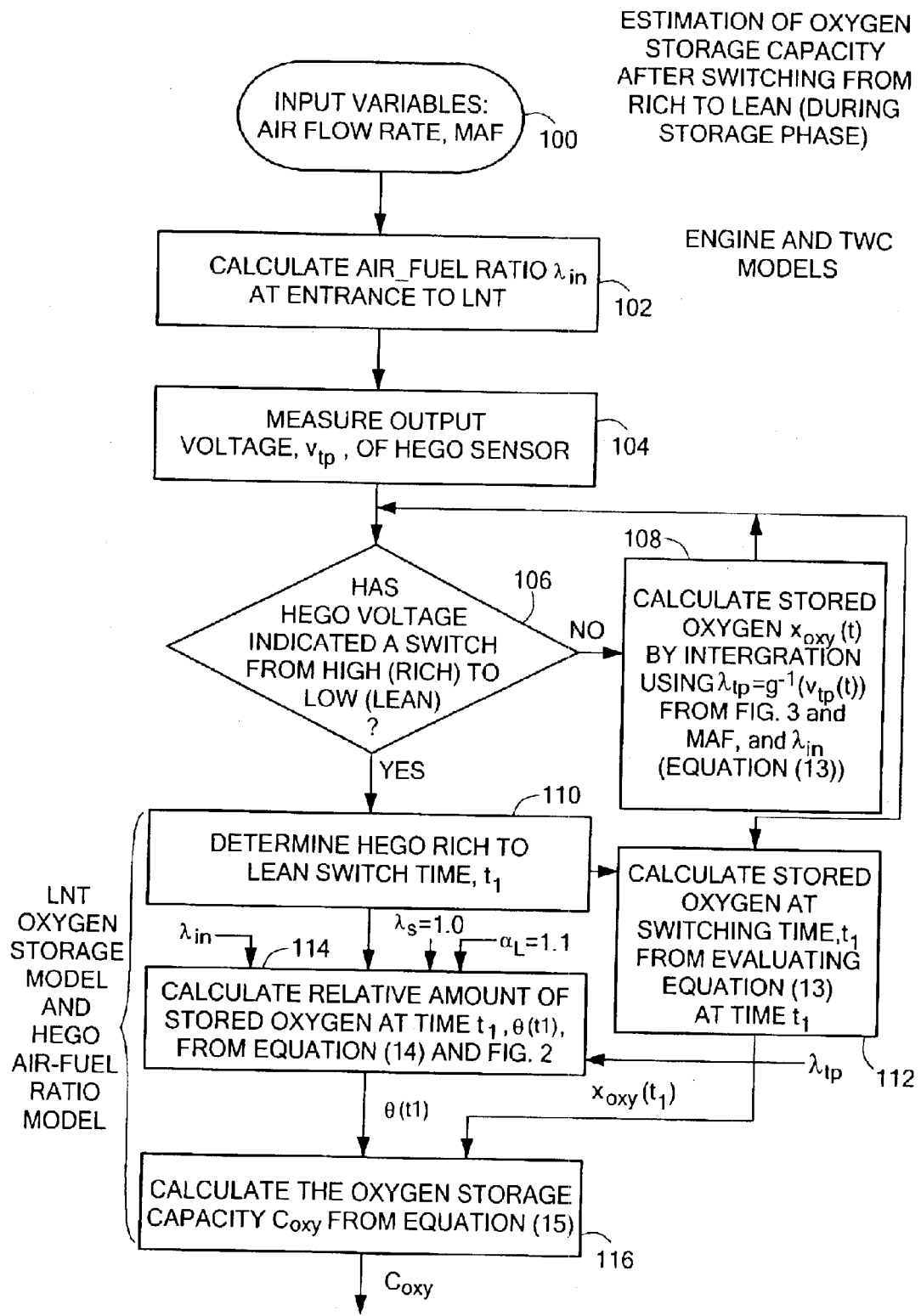
FIG. 5 is a flow diagram of a process used to estimate oxygen storage capacity of the LNT used in FIG. 1 according to the invention.

From the above, flow diagrams of code stored in the ROM, a semiconductor chip, of the electronic engine controller 14 of FIG. 1 will be described below:

Referring now to FIG. 5, in step 100, input variables, such as MAF are measured or estimated. The air fuel ratio, $\lambda_{in}$, at the entrance to the LNT is measured or estimated in step 102.

In step 104, the output voltage of the HEGO sensor, $v_{tp}(t)$ is measured. Thus, step 104 provides a time history, or trajectory, of the HEGO output voltage, $v_{tp}(t)$. From such HEGO time history, $v_{tp}(t)$, a determination is made as to whether the voltage $v_{tp}(t)$ has passed from a high voltage, (i.e., condition rich of stoichiometry) to a low voltage (i.e., a condition lean of stoichiometry) in step 106. If not, a calculation is made of the amount of oxygen stored in that LNT, $x_{oxy}(t)$, as a function of time, t, during the storage phase in step 108. Such calculation of, $x_{oxy}(t)$, is made by determining from the HEGO voltage $v_{tp}(t)$ and using FIG. 3 to determine $\lambda_{tp}$. From $\lambda_{tp}=g^{-1}(v_{tp}(t))$, MAF and $\lambda_{in}$, $\lambda_{oxy}(t)$ is determined from equation (13).

If in step 106 it is determined that the HEGO sensor has switched from a rich condition to a lean condition, the time $t_1$ at which such switch occurred is determined in step 110. It is noted that at the switch time, $t_1$, $\lambda_{tp}$ passes through stoichiometry, i.e., 1.0.

The amount of stored oxygen, being calculated in step 108 is evaluated at the switch time $t_1$ in step 112 to determine $x_{oxy}(t_1)$. Also, in step 114, a calculation is made of the relative amount of oxygen stored at the switch time, $t_1$, $\theta(t_1)$ from equation (14) using the air-fuel ratio at the tail pipe $\lambda_{tp}=1.0$ (i.e., stoichiometry) at the switch time $t_1$, using the determined $\lambda_{in}$, and using an $\alpha=1.1$ to determine $\rho_L$, and using the determined $\rho_L$ with FIG. 2 to determined $\theta(t_1)$.

As noted above, step 112 determines the amount of stored oxygen $x_{oxy}(t_1)$ at time $t_1$. Step 116 determines the oxygen storage capacity using from $\theta(t_1)$ and $x_{oxy}(t_1)$ using equation 15.

Estimation of the Remaining NOx in LNT Under Rich Operation

When the HEGO emf switches from low to high at $t_0$, we obtain the equation $$R'_0 = \frac{2\frac{-(1-\alpha)\dot{x}_{oxy}}{M_{O_2}} - \frac{\dot{x}_{NOx}}{M_{NOx}}}{\frac{W^{in}_{CO} + c_3\alpha\dot{x}_{oxy} + \beta\dot{x}_{NOx}}{M_{CO}} + \frac{W^{in}_{H_2}}{M_{H_2}} + 3\cdot 8\cdot \frac{W^{in}_{HC}}{M_{HC}}} \quad (16)$$

From this equation, $\dot{x}_{NOx}(t_0)$ can be expressed as $$\dot{x}_{NOx}(t_0) = M_{NOx}\left(2\frac{-(1-\alpha)\dot{x}_{oxy}}{M_{O_2}} - R'_0\left(\frac{W_{CO}^{in} + c_3\alpha\dot{x}_{oxy} + \beta\dot{x}_{NOx}}{M_{CO}} + \frac{W_{H_2}^{in}}{M_{H_2}} + 3\cdot 8\cdot\frac{W_{HC}^{in}}{M_{HC}}\right)\right) \quad (17)$$

Here, $\dot{x}_{oxy}(t_0)$ is calculated from the oxygen purge model since the initial condition $\dot{x}_{oxy}(0)=C_{oxy}$ is known. For most applications, the stored oxygen will be completely depleted at the time of HEGO switch making $\dot{x}_{oxy}(t_0)$ approximately equal to zero. From the calculated $\dot{x}_{NOx}(t_0)$, we can calculate $x_{NOx}(t_0)$ using equation shown below.

$$\dot{x}_{NOx}(t_0) = c_2[W_{NOx}^{in} + c_1 x^{NOx}(t_0) - 6.569(W_{CO}^{in} - 1.7506\alpha\dot{x}_{oxy})] - c_1 x_{NOx} \quad (18)$$

Finally, the model $$\frac{dx_{NOx}}{dt} = c_2[W_{NO_x}^{in} + c_1 x_{NO_x} - 0.6569(W_{CO}^{in} - 1.7506\cdot\alpha\cdot\dot{x}_{oxy})] - c_1 x_{NO_x} \quad (19)$$

together with the initial condition $x_{NOx}(t_0)$ can be used to predict the time duration of the $NO_x$ purge. Once $x_{NOx}$ is calculated, equation (5) can be used together with the initial condition $x_{NOx}(t_0)$ to predict the termination time of NOx purge:

$$x_{NOx} = \int_{t_0}^{t} \frac{dx_{NOx}}{dt}\,dt + x_{NOx}(t_0)$$

From the above, it is noted that the HEGO sensor can provide critical information for estimating the internal state of the LNT, including the oxygen storage capacity and stored NOx.

Figure 6:
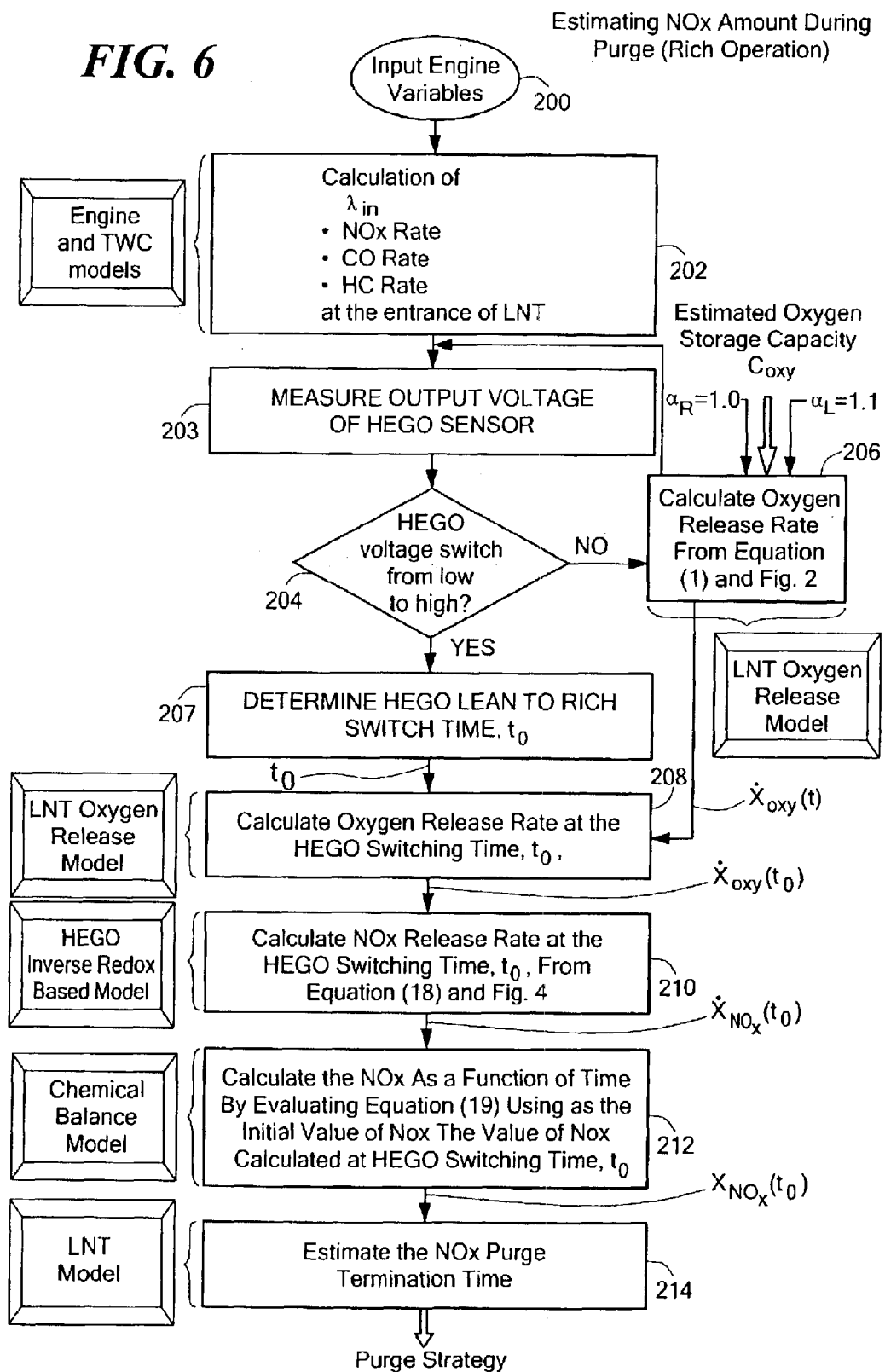
FIG. 6 is a flow diagram of a process used to estimate NOx during a purge phase of the LNT used in FIG. 1 according to the invention.

From the above, flow diagrams of code stored in the ROM of the electronic engine controller 14 of FIG. 1 will be described below:

Referring now to FIG. 6, in step 200, input variables are introduced and in step 202 such variables are used to determine $W_{CO}^{in}$, $W_{H2}^{in}$, $W_{HC}^{in}$, from engine models and measured quantities such as air-fuel ratio and MAF, the moles of $O_2$, CO, HC, NO, and $H_2$ are calculated, and $\lambda_{in}$ is measured or calculated.

In step 203, the HEGO sensor output voltage as a function of time, (i.e., the HEGO output voltage trajectory), $v_{tp}(t)$, is measured. From such measured HEGO voltage output, a determination is made in step 204 as to whether the voltage has switched from a low voltage condition (i.e., indicating a condition lean of stoichiometry) to a high voltage condition (i.e., a indicating a condition lean of stoichiometry). If such HEGO voltage has not switched., a calculation s made of the oxygen release rate, $dx_{oxy}/dt(t)$, as a function of time, t. Such calculation is made from equation (1) where, the oxygen storage capacity $C_{oxy}$ is estimated in step 118, described above, MAF is measured, $\lambda_{in}$ is calculated, $\alpha_L=1.1$ and $\alpha_R=1$ and FIG. 2 is used for its relationship between and $\rho_L$ and $\rho_R$, it being noted that $\theta=x_{oxy}/C_{oxy}$.

If, in step 204, it is determined that the HEGO sensor has switched from low to high, the time, $t_0$, of such switching is determined in step 207. It is noted that at the switch time, $t_0$, $\lambda_{tp}$ passes through stoichiometry, i.e., 1.0.

From the calculated oxygen release rate, $dx_{oxy}/dt(t)$ being performed in step 206, such calculated is evaluated at the switch time $t_0$, (i.e., $dx_{oxy}/dt(t_0)$) in step 208.

The NOx release rate at the switch time $t_0$, $dx_{NOx}/dt(t_0)$, is calculated in step 210 from equations (18), where FIG. 4 is used to determine the Redox number R' at the switch time, $t_0$, i.e., $R'_0$. As noted above, R' is a function of the LNT temperature, T, here a measured or estimated parameter. That is, as noted above, from chemical reactions and physics principles, HEGO voltage (emf) can be defined as a switch-type nonlinear function of R' (known as inverse Redox ratio) and temperature T, as shown by the curve in FIG. 4.

In step 212, equation (19) is calculated to provide the time history of the amount of residual NOx stored in the LNT (i.e., $x_{NOx}(t)$) where the initial value of $x_{NOx}(t)$ (i.e., the amount of NOx stored at the switch time, $t_0$, $x_{NOx}(t_0)$) was determined in step 210.

The calculated $X_{NOx}(t)$ may be compared with a threshold level to provide a purge termination signal or an LNT model may be used to estimate the purge time, as in step 214

A number of embodiments of the invention have been described. Nevertheless, it will be understood that various modifications may be made without departing from the spirit and scope of the invention. For example, the method can be applied for different model structures of LNT and HEGO. Accordingly, other embodiments are within the scope of the following claims.

What is claimed is:

1. A method for estimating oxygen storage capacity of a lean NOx trap (LNT) used in an internal combustion engine, such engine having a sensor disposed downstream of the LNT, such sensor producing an output signal time history indicating an air-fuel ratio time history of such exhaust, such method comprising:

integrating the output signal over time to determine the amount of oxygen stored in the LNT as function of time;

evaluating the integrated output signal at a time the voltage indicates the exhaust has switched from a condition rich of stoichiometry to a condition lean of stoichiometry;

calculating a relative amount of oxygen stored in the LNT at the switch time, such calculation being a function of the air-fuel ratio of the exhaust and an air-fuel ratio of exhaust leaving the LNT; and calculating the oxygen storage capacity as a function of the calculated relative amount of oxygen stored in the LNT at the switch time and the evaluated integrated output signal at the time the voltage indicates the exhaust has switched from rich of stoichiometry to lean of stoichiometry.

2. A method for estimating the amount of NOx in lean NOx trap (LNT) used in an internal combustion engine such engine having an sensor disposed downstream of the LNT, such sensor producing an output signal time history indicating an air-fuel ratio time history of such exhaust, such method comprising:

calculating an oxygen rate from the LNT over time as a function of the produced output signal and an estimated oxygen storage capacity of the LNT;

evaluating the calculated oxygen raze at a time the voltage indicates the exhaust has switched from a condition lean of stoichiometry to a condition rich of stoichiometry calculating a NOx release rule at the switch time, such release rate being a function of the output voltage at the switch time;

calculating the amount of NOx in the LNT as a function of time using as an initial condition the calculated NOx release rate at the switch time.

3. An article of manufacture comprising:
a computer storage medium having a program encoded therein for estimating oxygen storage capacity of a lean NOx trap (LNT) used in an internal combustion engine such engine having a sensor disposed downstream of the LNT, such sensor producing an output signal time history indicating an air-fuel ratio time history of such exhaust, such computer storage medium comprising:
code for integrating the output signal over time to determine the amount of oxygen stored in the LNT as function of time;
code for evaluating the integrated output signal at a time the voltage indicates the exhaust has switched from a condition rich of stoichiometry to a condition lean of stoichiometry;
code for calculating a relative amount of oxygen stored in the LNT at the switch time, such calculation being a function of the air-fuel ratio of the exhaust and an air-fuel ratio of exhaust leaving the LNT; and
code for calculating the oxygen storage capacity as a function of the calculated relative amount of oxygen stored in the LNT at the switch time and the evaluated integrated output signal at the time the voltage indicates the exhaust has switched from rich of stoichiometry to lean of stoichiometry.

4. The article of manufacture recited in claim 3 wherein the medium comprises is a semiconductor chip.

5. An article of manufacture comprising:
a computer storage medium having a program encoded therein for estimating the amount of NOx in lean NOx trap (LNT) used in an internal combustion engine such engine having an sensor disposed downstream of the LNT, such sensor producing an output signal time history indicating an air-fuel ratio time history of such exhaust, such computer storage medium comprising:
code for calculating an oxygen rate from the LNT over time as a function of the produced output signal and an estimated oxygen storage capacity of the LNT;
code for evaluating the calculated oxygen rate at a time the voltage indicates the exhaust has switched from a condition lean of stoichiometry to a condition rich of stoichiometry;
code for calculating a NOx release rate at the switch time, such release rate being a function of the output voltage at the switch time;
code for calculating the amount of NOx in the LNT as a function of time using as an initial condition the calculated NOx release rate at the switch time.

6. The article of manufacture recited in claim 5 wherein the medium comprises is a semiconductor chip.

7. A system for estimating oxygen storage capacity of a lean NOx trap (LNT) used in an internal combustion engine, comprising:
a sensor disposed downstream of the LNT, such sensor producing an output signal time history indicating an air-fuel ratio time history of such exhaust;
a processor for:
integrating the output signal over time to determine the amount of oxygen stored in the LNT as function of time;
evaluating the integrated output signal at a time the voltage indicates the exhaust has switched from a condition rich of stoichiometry to a condition lean of stoichiometry;
calculating a relative amount of oxygen stored in the LNT at the switch time, such calculation being a function of the air-fuel ratio of the exhaust and an air-fuel ratio of exhaust leaving the LNT; and
calculating the oxygen storage capacity as a function of the calculated relative amount of oxygen stored in the LNT at the switch time and the evaluated integrated output signal at the time the voltage indicates the exhaust has switched from rich of stoichiometry to lean of stoichiometry.

8. A system for estimating oxygen storage capacity of a lean NOx trap (LNT) used in an internal combustion engine, comprising:
a sensor disposed downstream of the LNT, such sensor producing an output signal time history indicating an air-fuel ratio time history of such exhaust;
a processor for
estimating the amount of NOx in lean NOx trap (LNT) used in an internal combustion engine such engine having an sensor disposed downstream of the LNT, such sensor producing an output signal time history indicating an air-fuel ratio time history of such exhaust
calculating an oxygen rate from the LNT a over time as a function of the produced output signal and an estimated oxygen storage capacity of the LNT;
evaluating the calculated oxygen rare at a time the voltage indicates the exhaust has switched from a condition lean of stoichiometry to a condition rich of stoichiometry;
calculating a NOx release rate at the switch time, such release rate being a function of the output voltage at the switch time; calculating the amount of NOx in the LNT as a function of time using as an initial condition the calculated-NOx release rate at the switch time.

* * * * *